United States Patent
Uhm et al.

(10) Patent No.: US 9,923,188 B2
(45) Date of Patent: Mar. 20, 2018

(54) BATTERY CASE AND LITHIUM SECONDARY BATTERY INCLUDING TWO SEPARATED ACCOMMODATION PARTS

(71) Applicant: LG CHEM, LTD., Seoul (KR)

(72) Inventors: InSung Uhm, Daejeon (KR); Je Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 720 days.

(21) Appl. No.: 14/339,665

(22) Filed: Jul. 24, 2014

(65) Prior Publication Data

US 2015/0030895 A1    Jan. 29, 2015

(30) Foreign Application Priority Data

Jul. 25, 2013 (KR) .................. 10-2013-0088226

(51) Int. Cl.
| | |
|---|---|
| *H01M 2/36* | (2006.01) |
| *H01M 2/12* | (2006.01) |
| H01M 10/052 | (2010.01) |
| H01M 2/04 | (2006.01) |
| H01M 2/38 | (2006.01) |

(52) U.S. Cl.
CPC ............ *H01M 2/36* (2013.01); *H01M 2/1241* (2013.01); *H01M 2/04* (2013.01); *H01M 2/1252* (2013.01); *H01M 2/38* (2013.01); *H01M 10/052* (2013.01)

(58) Field of Classification Search
CPC ........ H01M 2/36; H01M 2/1241; H01M 2/04; H01M 10/052; H01M 2/38; H01M 2/1252
See application file for complete search history.

(56) References Cited

U.S. PATENT DOCUMENTS

| | | | | |
|---|---|---|---|---|
| 2006/0166087 A1* | 7/2006 | Ogata | ............. | H01M 2/0242 429/153 |
| 2008/0160400 A1* | 7/2008 | Oh | .............. | H01M 2/0245 429/153 |
| 2009/0068549 A1* | 3/2009 | Hamada | .............. | H01M 2/1252 429/56 |
| 2012/0015218 A1* | 1/2012 | Lee | .............. | H01M 2/1223 429/53 |
| 2012/0214059 A1* | 8/2012 | Bauer | .............. | H01M 4/70 429/211 |
| 2012/0282499 A1* | 11/2012 | Eichinger | .......... | H01M 2/1235 429/56 |
| 2013/0316201 A1* | 11/2013 | Tanaka | ............. | H01M 2/1229 429/56 |
| 2015/0030893 A1* | 1/2015 | Mack | ............. | H01M 2/1223 429/56 |

FOREIGN PATENT DOCUMENTS

| | | |
|---|---|---|
| JP | 5346839 B2 | 11/2013 |
| KR | 10-2011-0035635 A | 4/2011 |
| WO | WO 2012/111742 A1 | 8/2012 |

OTHER PUBLICATIONS

JP 2011165614 MT.*
KR20110035635 MT.*

* cited by examiner

*Primary Examiner* — Alex Usyatinsky
(74) *Attorney, Agent, or Firm* — Birch, Stewart, Kolasch & Birch, LLP

(57) ABSTRACT

Disclosed is a battery case including a case part including a first accommodation part having an irreversible opening to irreversibly release a closed state and a second accommodation part separated from the first accommodation part, and a cover part installed at the case part.

15 Claims, 1 Drawing Sheet

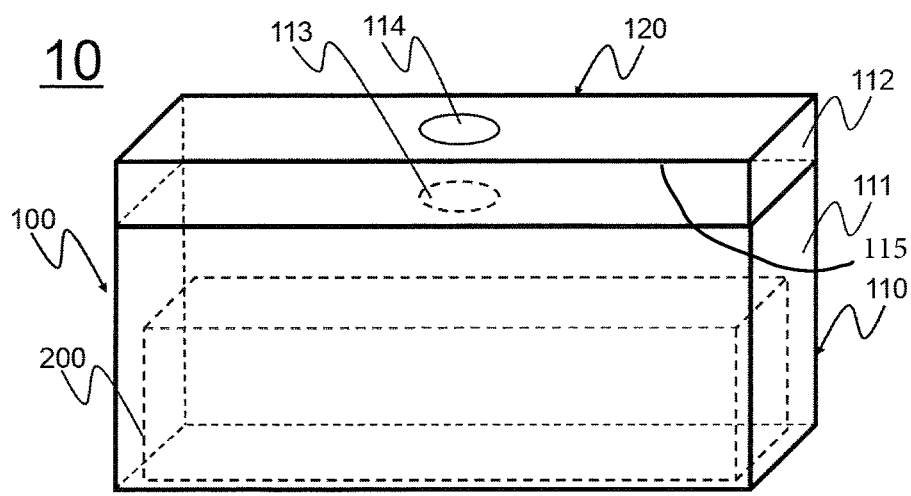

BATTERY CASE AND LITHIUM SECONDARY BATTERY INCLUDING TWO SEPARATED ACCOMMODATION PARTS

TECHNICAL FIELD

The present invention relates to a battery case and a lithium secondary battery including two separated accommodation parts.

BACKGROUND ART

As mobile device technology continues to develop and demand therefor continues to increase, demand for secondary batteries as energy sources is rapidly increasing. Among these secondary batteries, research on lithium secondary batteries, which exhibit high energy density and discharge voltage, is underway and such lithium secondary batteries are commercially available and widely used.

In general, secondary batteries have a structure in which an electrode assembly including a cathode, an anode, and a separator disposed therebetween is accommodated in a stacked or wound form in a battery case made of a metal can or a laminate sheet and an electrolyte is injected thereinto or the electrode assembly is impregnated with an electrolyte.

These secondary batteries undergo increase in volume due to anode expansion, gas generation, or the like when in use and the amount of an electrolyte is gradually decreased due to side reactions of an anode and electrolyte oxidation at a cathode, which results in deteriorated battery lifespan.

Therefore, there is an urgent need to develop a novel lithium secondary battery that addresses the problems described above.

DISCLOSURE

Technical Problem

Therefore, the present invention has been made to solve the above problems and other technical problems that have yet to be resolved.

That is, it is an object of the present invention to provide a battery case and a lithium secondary battery that may maintain the amount of an electrolyte impregnated in an electrode assembly at a certain level and secure battery lifespan.

Technical Solution

In accordance with one aspect of the present invention, provided is a battery case including: a case part including a first accommodation part having an irreversible opening to irreversibly release a closed state and a second accommodation part separated from the first accommodation part; and a cover part installed at the case part.

That is, the battery case according to the present invention includes the first accommodation part having an irreversible opening and the second accommodation part separated from the first accommodation part and thus may maintain the amount of electrolyte impregnated in an electrode stack at a certain level and secure battery lifespan.

The irreversible opening may include a groove ruptured by applied pressure.

The case part may be a metal can.

The metal can may be a rectangular can or a cylindrical can.

The irreversible opening may include at least two irreversible openings, for example, a first irreversible opening and a second irreversible opening. The first irreversible opening may be in communication with the second accommodation part when opened and the second irreversible opening may be in communication with the outside when opened.

An inner wall of the case part including the second irreversible opening may be provided with a porous film that does not allow liquid to permeate.

The first irreversible opening may have a structure of being opened in a direction from the second accommodation part to the first accommodation part, and the second irreversible opening may have a structure of being opened in a direction from the second accommodation part to the outside.

The first irreversible opening may be opened before the second irreversible opening.

The first irreversible opening may have a rupture pressure of 1.5 kgf/cm$^2$ to 5.5 kgf/cm$^2$. When the rupture pressure of the first irreversible opening is less than 1.5 kgf/cm$^2$, the first irreversible opening may be ruptured even though a small amount of gas is generated. On the other hand, when the rupture pressure of the first irreversible opening exceeds 5.5 kgf/cm$^2$, the first irreversible opening is unable to be ruptured even though a large amount of gas is generated and thus the generated gas may not be discharged to the first accommodation part. Thus, an appropriate rupture pressure of the first irreversible opening may be in the range of 1.5 kgf/cm$^2$ to 5.5 kgf/cm$^2$. More particularly, the rupture pressure of the first irreversible opening may be 2 kgf/cm$^2$ to 5 kgf/cm$^2$.

The second irreversible opening may have a rupture pressure of 7.5 kgf/cm$^2$ to 12.5 kgf/cm$^2$. When the rupture pressure of the second irreversible opening is less than 7.5 kgf/cm$^2$, the second irreversible opening may be ruptured even though a small amount of gas is generated. On the other hand, when the rupture pressure of the first irreversible opening exceeds 12.5 kgf/cm$^2$, the second irreversible opening is unable to be ruptured even though a large amount of gas is generated and thus the generated gas may not be discharged to the outside. Thus, an appropriate rupture pressure of the second irreversible opening may be in the range of 7.5 kgf/cm$^2$ to 12.5 kgf/cm$^2$. More particularly, the rupture pressure of the second irreversible opening may be 8 kgf/cm$^2$ to 12 kgf/cm$^2$.

The present invention also provides a lithium secondary battery including: the battery case described above; a first liquid electrolyte accommodated in the first accommodation part; an electrode stack accommodated in the first accommodation part; and a second liquid electrolyte accommodated in the second accommodation part.

The electrode stack may include at least one cathode, at least one anode, and at least one separator disposed therebetween, in which first and second ends of each of the cathode and the anode are alternately arranged with respect to each other.

The electrode stack may include at least one cathode, at least one anode, and at least one separator disposed therebetween, in which first and second ends of each of the cathode and the anode are not alternately arranged.

The electrode stack may include at least one cathode, at least one anode, and at least one separator disposed therebetween, in which the separator includes a first separator and a second separator, wherein the second separator surrounds a side surface of an electrode at which an electrode tab is not formed.

The present invention also provides a battery pack including the lithium secondary battery as a unit battery.

The present invention also provides a device including the battery pack as a power source. In particular, the device may be selected from the group consisting of a mobile phone, a portable computer, a smart phone, a smart pad, a netbook computer, a light electric vehicle (LEV), an electric vehicle, a hybrid electric vehicle, a plug-in hybrid electric vehicle, and a device for storing power.

The electrode may be a cathode or an anode and may be fabricated using a manufacturing method including the following processes.

The method of manufacturing an electrode includes: preparing a binder solution by dispersing or dissolving a binder in a solvent; preparing an electrode slurry by mixing the binder solution with an electrode active material and a conductive material; coating the electrode slurry onto a current collector; drying the electrode; and compressing the electrode to a certain thickness.

In some cases, the method may further include drying the compressed electrode.

The preparing of the binder solution is a process of preparing a binder solution by dispersing or dissolving a binder in a solvent.

The binder may be all binders known in the art and, in particular, may be one selected from the group consisting of fluorine resin-based binders including polyvinylidene fluoride (PVdF) or polytetrafluoroethylene (PTFE), rubber-based binders including styrene-butadiene rubber, acrylonitrile-butadiene rubber, or styrene-isoprene rubber, cellulose-based binders including carboxymethylcellulose (CMC), starch, hydroxypropylcellulose, or regenerated cellulose, polyalcohol-based binders, polyolefin-based binders including polyethylene or polypropylene, polyimide-based binders, polyester-based binders, a mussel adhesive, and silane-based binders or a mixture or copolymer of at least two of the above-listed binders.

The solvent may be selectively used according to kind of a binder, e.g., an organic solvent such as isopropyl alcohol, N-methylpyrrolidone (NMP), acetone, or the like, water, or the like.

In a specific embodiment, a binder solution for cathodes may be prepared by dispersing or dissolving PVdF in NMP, and a binder solution for anodes may be prepared by dispersing or dissolving styrene-butadiene rubber (SBR)/carboxymethylcellulose (CMC) in water.

An electrode slurry may be prepared by mixing/dispersing an electrode active material and a conductive material in the binder solution. The prepared electrode slurry may be transferred using a storage tank and stored prior to use in a coating process. To prevent the electrode slurry from becoming hard, the electrode slurry may be continuously stirred in the storage tank.

The electrode active material may be a cathode active material or an anode active material.

In particular, the cathode active material may be layered compounds such as lithium cobalt oxide ($LiCoO_2$) and lithium nickel oxide ($LiNiO_2$) or compounds substituted with one or more transition metals; lithium manganese oxides represented by $Li_{1+y}Mn_{2-y}O_4$ where $0 \leq y \leq 0.33$, such as $LiMnO_3$, $LiMn_2O_3$, and $LiMnO_2$; lithium copper oxide ($Li_2CuO_2$); vanadium oxides such as $LiV_3O_8$, $LiV_3O_4$, $V_2O_5$, and $Cu_2V_2O_7$; Ni-site type lithium nickel oxides having the formula $LiNi_{1-y}M_yO_2$ where M=Co, Mn, Al, Cu, Fe, Mg, B, or Ga, and $0.01 \leq y \leq 0.3$; lithium manganese composite oxides having the formula $LiMn_{2-y}M_yO_2$ where M=Co, Ni, Fe, Cr, Zn, or Ta, and $0.01 \leq y \leq 0.1$ or the formula $Li_2Mn_3MO_8$ where M=Fe, Co, Ni, Cu, or Zn; $LiMn_2O_4$ where some of the Li atoms are substituted with alkaline earth metal ions; disulfide compounds; and $Fe_2(MoO_4)_3$, but embodiments of the present invention are not limited thereto.

In a non-limiting embodiment, the electrode active material may be a spinel-structure lithium metal oxide represented by Formula (1) below as a cathode active material:

$$Li_xM_yMn_{2-y}O_{4-z}A_z \qquad (1)$$

wherein $0.9 \leq x \leq 1.2$ and $0 < y < 2$, and $0 \leq z < 0.2$;

M is at least one element selected from the group consisting of Al, Mg, Ni, Co, Fe, Cr, V, Ti, Cu, B, Ca, Zn, Zr, Nb, Mo, Sr, Sb, W, Ti, and Bi; and A is at least one monovalent or divalent anion.

A maximum substitution amount of A may be less than 0.2 mol % and, in particular, A may be at least one anion selected from the group consisting of halogens such as F, Cl, Br, and I, S, and N.

Due to substitution of these anions, bonding strength between the anion and the transition metal is increased and structural transition of the compound of Formula (1) is prevented and thus lifespan of the lithium secondary battery may be enhanced. On the other hand, when the substitution amount of A is too large ($t \geq 0.2$), lifespan characteristics of the lithium secondary battery may be rather deteriorated due to an unstable crystal structure of the compound of Formula (1).

In particular, the spinel-structure lithium metal oxide of Formula (1) may be a lithium metal oxide represented by Formula (2) below:

$$Li_xNi_yMn_{2-y}O_4 \qquad (4)$$

wherein $0.9 \leq x \leq 1.2$ and $0.4 \leq y \leq 0.5$.

More specifically, the lithium metal oxide may be $LiNi_{0.5}Mn_{1.5}O_4$ or $LiNi_{0.4}Mn_{1.6}O_4$.

The anode active material may further include, for example, carbon such as hard carbon, graphite-based carbon, or the like; metal composite oxides such as $Li_xFe_2O_3$ where $0 \leq x \leq 1$, $Li_xWO_2$ where $0 \leq x \leq 1$, $Sn_xMe_{1-x}Me'_yO_z$ where Me: Mn, Fe, Pb or Ge; Me': Al, B, P, Si, Group I, Group II and Group III elements, or halogens; $0 < x \leq 1$; $1 \leq y \leq 3$; and $1 \leq z \leq 8$; lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene and the like; Li—Co—Ni-based materials.

In a non-restrictive embodiment, the electrode active material may include a lithium metal oxide as an anode active material, in which the lithium metal oxide may be represented by Formula (3) below:

$$Li_aM'_bO_{4-c}A_c \qquad (3)$$

wherein M' is at least one element selected from the group consisting of Ti, Sn, Cu, Pb, Sb, Zn, Fe, In, Al, and Zr;

$0.1 \leq a \leq 4$ and $0.2 \leq b \leq 4$ wherein a and b are determined according to oxidation number of M';

$0 \leq c < 0.2$ wherein c is determined according to oxidation number of A; and A is at least one monovalent or divalent anion.

The lithium metal oxide of Formula (3) may be represented by Formula (4) below:

$$Li_aTi_bO_4 \qquad (4)$$

wherein $0.5 \leq a \leq 3$ and $1 \leq b \leq 2.5$.

Examples of the lithium metal oxide include, but are not limited to, $Li_{0.8}Ti_{2.2}O_4$, $Li_{2.67}Ti_{1.33}O_4$, $LiTi_2O_4$, $Li_{1.33}Ti_{1.67}O_4$, and $Li_{1.14}Ti_{1.71}O_4$.

In a non-restrictive embodiment, the lithium metal oxide may be $Li_{1.33}Ti_{1.67}O_4$ or $LiTi_2O_4$. In this regard, $Li_{1.33}Ti_{1.67}O_4$ has a spinel structure having a small change in crystal structure during charge/discharge and high reversibility.

The lithium metal oxide may be prepared using a manufacturing method known in the art, for example, solid-state reaction, a hydrothermal method, a sol-gel method, or the like.

The lithium metal oxide may be in the form of a secondary particle in which primary particles are agglomerated with one another.

The secondary particle may have a diameter of 200 nm to 30 μm.

When the diameter of the secondary particle is less than 200 nm, a large amount of solvent is needed in the process of preparing an anode slurry and thus productivity is reduced and it is difficult to control the amount of moisture. On the other hand, when the diameter of the secondary particle exceeds 30 μm, diffusion rate of lithium ions is slow and thus it may be difficult to achieve high output.

The amount of the lithium metal oxide may be 50 wt % to 100 wt % based on a total weight of the anode active material.

A case in which the amount of lithium titanium oxide is 100 wt % based on the total weight of the anode active material means a case in which the anode active material is formed of lithium titanium oxide alone.

The conductive material is not particularly limited so long as it has conductivity and does not cause chemical changes in the fabricated battery. Examples of conductive materials include graphite such as natural or artificial graphite; carbon black such as carbon black, acetylene black, Ketjen black, channel black, furnace black, lamp black, and thermal black; conductive fibers such as carbon fibers and metallic fibers; metallic powders such as carbon fluoride powder, aluminum powder, and nickel powder; conductive whiskers such as zinc oxide and potassium titanate; conductive metal oxides such as titanium oxide; and polyphenylene derivatives.

The electrode slurry may further optionally include a filler or the like, as desired. The filler is not particularly limited so long as it is a fibrous material that does not cause chemical changes in the fabricated battery. Examples of the filler include olefin-based polymers such as polyethylene and polypropylene; and fibrous materials such as glass fiber and carbon fiber.

The coating of the electrode slurry is a process of coating the electrode slurry on a current collector in a predetermined pattern and to a uniform thickness by passing through a coater head.

The coating of the electrode slurry may be performed by applying the electrode slurry to the current collector and uniformly dispersing the electrode slurry thereon using a doctor blade. In another embodiment, the coating process may be performed by die-casting, comma coating, screen-printing, or the like. In another embodiment, the electrode slurry may be molded on a separate substrate and then adhered to a current collector via pressing or lamination.

The current collector is not particularly limited so long as it does not cause chemical changes in the fabricated secondary battery and has high conductivity. For example, the current collector may be made of copper, stainless steel, aluminum, nickel, titanium, sintered carbon, copper or stainless steel surface-treated with carbon, nickel, titanium, silver, or the like, or aluminum-cadmium alloys. A cathode current collector may have fine irregularities at a surface thereof to increase adhesion between a cathode active material and the cathode current collector and be used in any of various forms including films, sheets, foils, nets, porous structures, foams, and non-woven fabrics. In particular, the cathode current collector may be a metal current collector, e.g., an Al current collector, and an anode current collector may be a metal current collector, e.g., a Cu current collector. The electrode current collector may be metal foil, e.g., Al foil or Cu foil.

The drying process is a process of removing solvent and moisture from the electrode slurry to dry the electrode slurry coated on the metal current collector. In a specific embodiment, the drying process is performed in a vacuum oven at 50 to 200° C. for one day or less.

The electrode manufacturing method may further include a cooling process after the drying process. The cooling process may be performed by slowly cooling to room temperature such that a recrystallized structure of the binder is satisfactorily formed.

To increase capacity density of the coating-completed electrode and to increase adhesion between the current collector and the corresponding active material, the electrode may be compressed to a desired thickness by passing between two high-temperature heated rolls. This process is referred to as a rolling process.

Before passing between the two high-temperature heated rolls, the electrode may be subjected to a preheating process. The preheating process is a process of preheating the electrode before passing between the rolls in order to enhance compression effects of the electrode.

The rolling-completed electrode may be dried in a vacuum oven at 50 to 200° C. for one day or less, within a temperature range that is equal to or greater than a melting point of the binder. The rolled electrode may be cut to a uniform length and then dried.

After the drying process, a cooling process may be performed. The cooling process may be performed by slowly cooling to room temperature such that a recrystallized structure of the binder is satisfactorily formed.

The separator serves to separate the cathode from the anode and, when a solid electrolyte such as a polymer or the like is used as an electrolyte, the solid electrolyte may also act as a separator.

The separator may be an insulating thin film having high ion permeability and mechanical strength. The separator typically has a pore diameter of 0.01 to 10 μm and a thickness of 5 to 300 μm.

As the separator, sheets or non-woven fabrics made of an olefin polymer such as polypropylene, glass fibers, or polyethylene, which have chemical resistance and hydrophobicity, Kraft paper, or the like may be used. Applicable commercially available separators include Celgard type products (Celgard® 2400, 2300: Hoechest Celanese Corp.), polypropylene separators (Ube Industries Ltd., Pall RAI's products), polyethylene type separators (Tonen or Entek), and the like.

In some cases, the separator may be coated with a gel polymer electrolyte in order to increase stability of the lithium secondary battery. Examples of gel polymers include, but are not limited to, polyethylene oxide, polyvinylidene fluoride, and polyacrylonitrile.

Examples of the electrode stack include a jelly-roll type electrode assembly (or a winding-type electrode assembly), a stack-type electrode assembly, and a stack/folding electrode assembly, which are known in the art.

As used herein, the stack/folding electrode assembly may be understood to include stack/folding electrode assemblies manufactured by arranging a unit cell having a structure in which a separator is disposed between a cathode and an anode on a separator sheet and folding or winding the separator sheet.

In addition, the electrode stack may include an electrode stack in which a structure having any one of a cathode and an anode disposed between separators is laminated in a stacked state by thermal bonding.

The electrolyte may be a non-aqueous electrolyte, an organic solid electrolyte, an inorganic solid electrolyte, or the like.

Examples of the non-aqueous electrolyte include aprotic organic solvents such as N-methyl-2-pyrollidinone, propylene carbonate, ethylene carbonate, butylene carbonate, dimethyl carbonate, diethyl carbonate, ethylmethyl carbonate, gamma-butyrolactone, 1,2-dimethoxy ethane, 1,2-diethoxy ethane, tetrahydrofuran, 2-methyl tetrahydrofuran, dimethylsulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include, but are not limited to, polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include, but are not limited to, nitrides, halides and sulfates of lithium (Li) such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

A lithium salt is a material that is readily soluble in the non-aqueous electrolyte and examples thereof include, but are not limited to, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $LiSCN$, $LiC(CF_3SO_2)_3$, $(CF_3SO_2)_2NLi$, chloroborane lithium, lower aliphatic carboxylic acid lithium, lithium tetraphenyl borate, and imides.

In addition, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the electrolyte. If necessary, in order to impart incombustibility, the electrolyte may further include halogen-containing solvents such as carbon tetrachloride and ethylene trifluoride. Further, in order to improve high-temperature storage characteristics, the electrolyte may further include carbon dioxide gas, fluoro-ethylene carbonate (FEC), propene sultone (PRS), fluoro-propylene carbonate (FPC), or the like.

Effects of the Invention

As described above, a battery case according to the present invention includes a first accommodation part having an irreversible opening and a second accommodation part separated from the first accommodation part and thus may maintain the amount of electrolyte impregnated in an electrode stack at a certain level and secure battery lifespan.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a view of a lithium secondary battery including a battery case according to an embodiment of the present invention.

BEST MODE

Now, the present invention will be described in more detail with reference to the following examples. These examples are provided only for illustration of the present invention and should not be construed as limiting the scope and spirit of the present invention.

FIG. 1 is a view of a lithium secondary battery 10 including a battery case according to an embodiment of the present invention.

Referring to FIG. 1, the lithium secondary battery 10 includes a battery case 100, an electrode stack 200, a first liquid electrolyte (not shown), and a second liquid electrolyte (not shown).

The battery case 100 includes a case part 110 and a cover part 120, and the case part 110 includes first and second accommodation parts 111 and 112 separated from each other.

A first irreversible opening 113 is formed between the first and second accommodation parts 111 and 112, and a second irreversible opening 114 is formed between the second accommodation part 112 and the outside of the lithium secondary battery. The inner wall of the case part 110 comprising the second irreversible opening is provided with a porous film 115 that does not allow liquid to permeate.

The first liquid electrolyte are accommodated in the second accommodation unit 112, and the electrode stack 200 the second liquid electrolyte is accommodated in the first accommodation part 111.

The first irreversible opening 113 is opened by pressure of gas generated in the first accommodation part 111 and the generated gas moves to the second accommodation part 112 from the first accommodation part 111. Subsequently, the second liquid electrolyte moves to the first accommodation unit 111 via the opened first irreversible opening 113, whereby the amount of electrolyte impregnated in the electrode stack 200 is maintained at a certain level.

When the second accommodation part 112 is filled with gas as the gas is continuously generated, the second irreversible opening 114 is opened and thus the generated gas is discharged to the outside of the lithium secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery case comprising:
a case part comprising a first accommodation part having a first opening and a second opening and a second accommodation part separated from the first accommodation part; and
a cover part installed at the case part, wherein each first and second opening comprises a groove that is configured to be ruptured by application of a predetermined amount of rupture pressure, wherein the first opening is in communication with the second accommodation part when opened and the second opening is in communication with an outside of the battery case when opened, wherein the first opening has a rupture pressure of 1.5 kgf/cm² to 5.5 kgf/cm², and wherein the second opening has a rupture pressure of 7.5 kgf/cm² to 12.5 kgf/cm².

2. The battery case according to claim 1, wherein the case part is a metal can.

3. The battery case according to claim 2, wherein the metal can is a rectangular can or a cylindrical can.

4. The battery case according to claim 1, wherein an inner wall of the case part comprising the second opening is provided with a porous film that does not allow liquid to permeate.

5. The battery case according to claim 1, wherein the first opening is opened in a direction from the second accommodation part to the first accommodation part, and the second opening is opened in a direction from the second accommodation part to the outside of the battery case.

6. The battery case according to claim 1, wherein the first opening is opened before the second opening.

7. The battery case according to claim 1, wherein the first opening has a rupture pressure of 2 kgf/cm² to 5 kgf/cm².

8. The battery case according to claim 1, wherein the second opening has a rupture pressure of 8 kgf/cm² to 12 kgf/cm².

9. A lithium secondary battery comprising:
the battery case according to claim 1;
a first liquid electrolyte accommodated in the first accommodation part;
an electrode stack accommodated in the first accommodation part; and
a second liquid electrolyte accommodated in the second accommodation part.

10. The lithium secondary battery according to claim 9, wherein the electrode stack comprises at least one cathode, at least one anode, and at least one separator disposed between the cathode and the anode, wherein each cathode and anode comprises a first end and a second end opposite to the first end; and wherein the first and second ends of each of the cathode and the anode are alternately arranged with respect to each other.

11. The lithium secondary battery according to claim 9, wherein the electrode stack comprises at least one cathode, at least one anode, and at least one separator disposed between the cathode and the anode, wherein each cathode and anode comprises a first end and a second end opposite to the first end; and wherein the first and second ends of each of the cathode and the anode are not alternately arranged.

12. The lithium secondary battery according to claim 9, wherein the electrode stack comprises at least one cathode, at least one anode, and at least one separator disposed between the cathode and the anode, wherein the separator comprises a first separator and a second separator, wherein the second separator surrounds a side surface of an electrode at which an electrode tab is not formed.

13. A battery pack comprising the lithium secondary battery according to claim 9.

14. A device comprising the battery pack according to claim 13.

15. The battery case according to claim 1, wherein the first accommodation part is positioned directly above the second accommodation part.

* * * * *